United States Patent [19]
Diliberti

[11] 3,934,924
[45] Jan. 27, 1976

[54] CAMPING APPARATUS FOR VAN-TYPE VEHICLE

[76] Inventor: Joseph Diliberti, 9608 Easter Way, San Diego, Calif. 92131

[22] Filed: Oct. 24, 1974

[21] Appl. No.: 517,731

[52] U.S. Cl. .................. 296/23 R; 5/119; 108/44; 135/5 A; 312/237
[51] Int. Cl.² .................................................. B60P 3/32
[58] Field of Search ........ 296/22, 24 A, 37 R, 23 R, 296/1 R; 224/42.1 H, 42.1 E, 42.1 R, 42.43, 42.44, 42.01, 42.1 G, 42.46 R, 42.46 A, 42.46 B; 135/5 A, 5 AT; 108/44, 48; 312/237; 5/119; 214/450; 248/235

[56] References Cited
UNITED STATES PATENTS

| | | | |
|---|---|---|---|
| 2,873,139 | 2/1959 | Borders et al. | 108/44 |
| 3,113,819 | 12/1963 | Bessette | 224/42.1 E |
| 3,712,662 | 1/1973 | Busby | 296/23 R |
| 3,715,044 | 2/1973 | Simons | 224/42.1 E |
| 3,720,438 | 3/1973 | Johnson et al. | 135/5 AT |
| 3,809,425 | 5/1974 | Blaschke | 296/22 |
| 3,859,931 | 1/1975 | Lalonde | 108/44 |

FOREIGN PATENTS OR APPLICATIONS 1,437,374  3/1966  France .................. 135/5 A

*Primary Examiner*—Robert J. Spar
*Assistant Examiner*—Ross Weaver
*Attorney, Agent, or Firm*—Brown & Martin

[57] ABSTRACT

A skeletal structure is assembled to the side of a van-type vehicle which structure comprises a pair of parallel, spaced main supporting members which are connected by means of a clamp arrangement to the roof rain gutter of the vehicle and those members include claws as their bottom terminal portions which are adapted to grasp the lower body part of the vehicle. Each of the main supporting members includes horizontal sleeves into which are fit horizontal supporting members which are utilized to support a series of cabinets, a dressing table and an awning. Each of the horizontal supporting members includes a female channel into which are fit compatible or mating channels which are connected to each of the table, cabinets and awning. The apparatus is transported in an unassembled condition and assembled when a camping site has been reached.

2 Claims, 7 Drawing Figures

U.S. Patent   Jan. 27, 1976   Sheet 1 of 2   3,934,924
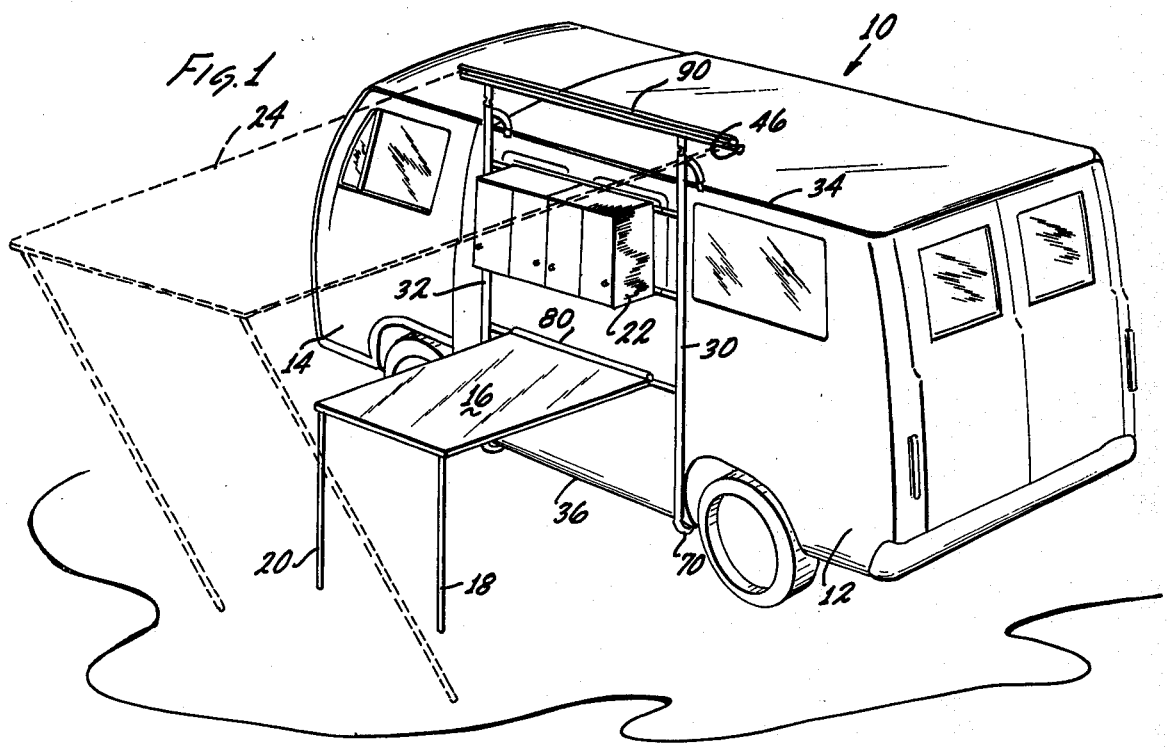
Fig. 1
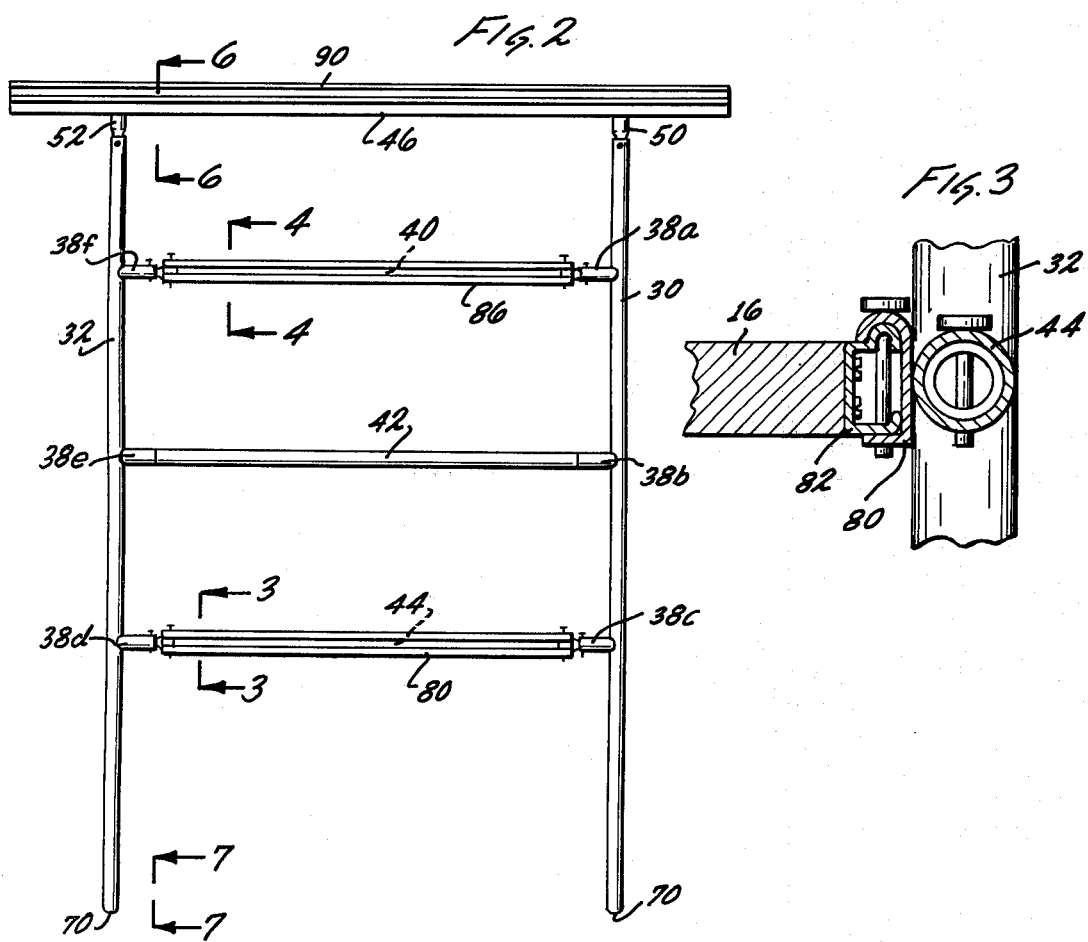
Fig. 2
Fig. 3

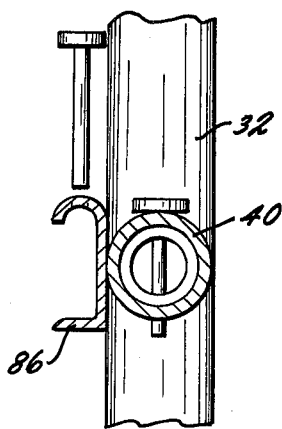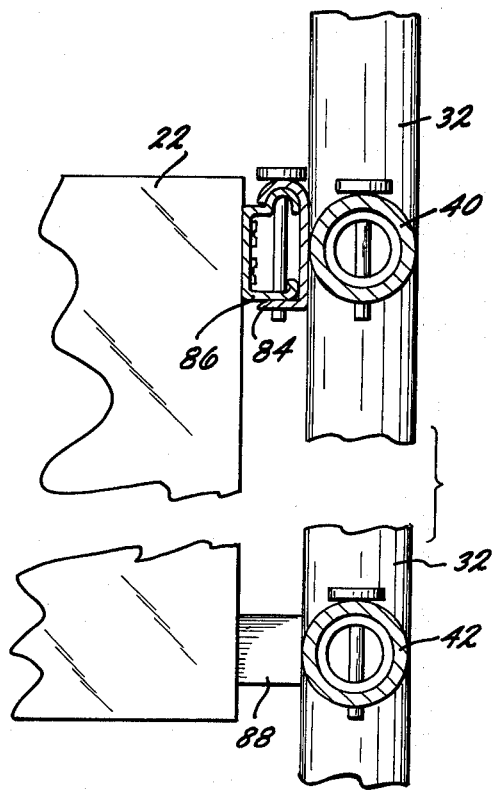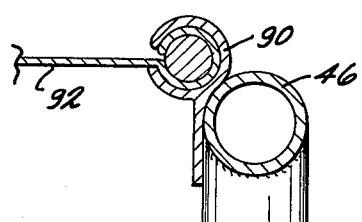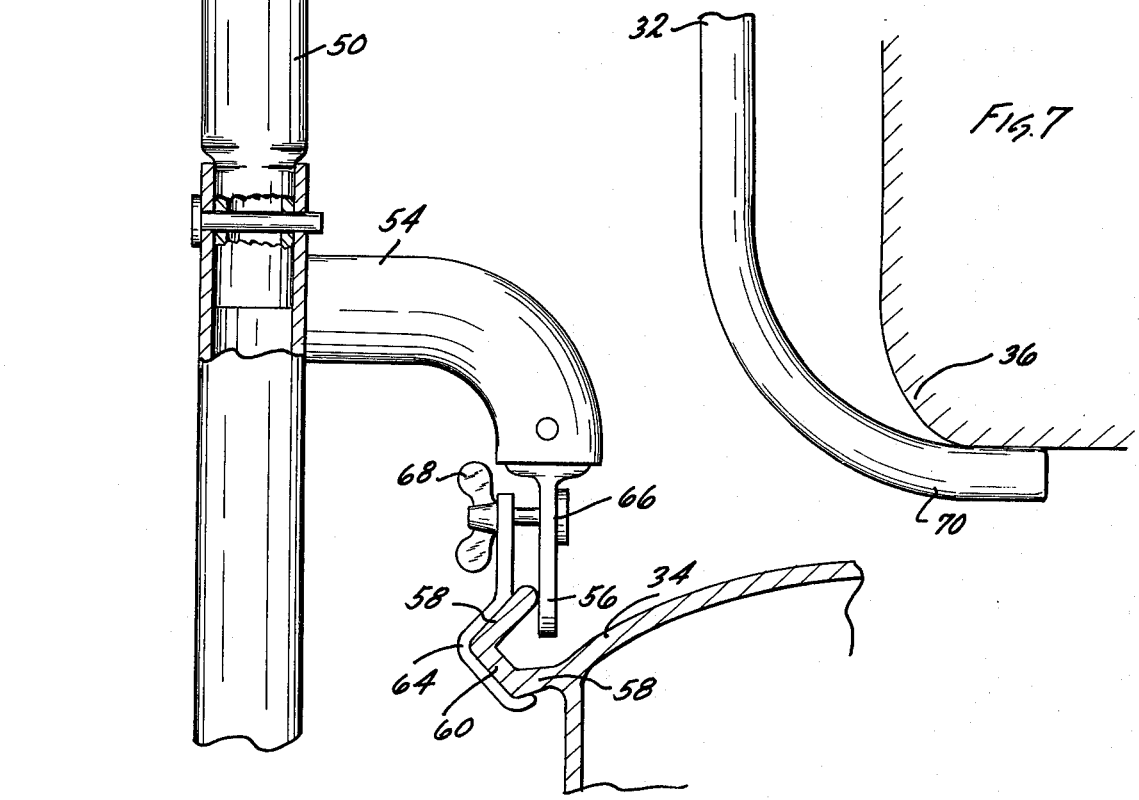

CAMPING APPARATUS FOR VAN-TYPE VEHICLE

BACKGROUND OF THE INVENTION

The present invention relates to camping apparatus for assembly to vehicles of the van-type body.

Camping, as a recreational pastime, is undergoing an extensive expansion as more and more people utilize the national park system and public and private camp sites which are found in numerous recreational areas around the country. As the propensity for camping has increased, so has the number, design and function of the vehicles people utilize in their camping trips. The so-called camping recreational vehicle has been developed to the point where it is literally an extension of one's home incorporating many of the conveniences found therein. Van-type vehicles are also finding extensive use in camping in that they are capable of additionally serving the function of being an all-around, multipurpose family or commercial vehicle. In other words, the van-type vehicle utilized in camping may also be used as a primary or secondary car in a family as well as finding extensive use in commercial applications.

This expanded use has prompted many designers and individuals to outfit the van with various ammenities which one would find convenient on a camping trip. For instance, storage cabinets, a dressing or eating table, awnings and other ammenities have been found quite convenient to carry along on a trip. The major drawback to the van, as opposed to the larger, more elaborately outfitted vehicle, is the rather limited space available in the interior of the van for storing these ammenities. There just is not enough room for free standing cabinets, separate table and the like, in the van while, at the same time, permitting occupants a certain degree of movement. Therefore, it has been found convenient to transport certain ammenities, such as a table, a bed, the cabinets and the awning in an unassembled state, in a condition wherein they can be stored in a relatively small space; assembly of these ammenities takes place outside the vehicle at the camp site. The present invention is directed toward just such assemblage which is affixed to the side panel of the vehicle, connected to the roof rain gutter and the lower body part. A table suitable for eating, dressing or any other purpose, cabinets and an awning are among the ammenities that are capable of being fixed to the skeletal support structure. The instant invention provides an assemblage which is quite easily affixed to the vehicle and which provides many of the ammenities that are so necessary in camping excursions.

SUMMARY OF THE INVENTION

It is an object of the instant invention to provide a camping assembly for van-type vehicles which permits the convenient assemblage to the side of the van-type vehicle.

It is a further object of the present invention to provide a camping assembly which, when stored, occupies a very small portion of the interior space of the vehicle.

Yet, another object of the instant invention is the provision of a camping assembly wherein the constituent elements are conveniently, yet, securely connected.

In accordance with the above designs, a skeletal structure is assembled to one side of a van-type vehicle and has as its primary elements a pair of parallel, main supporting members which are characterized by means clamping said members to the roof rain gutter of the vehicle and the lower terminal portions of which are of claw shape and adapted to grasp the lower body part of the vehicle. Auxiliary horizontal supporting members are telescopically assembled in oppositely disposed sleeves connected to the main supporting members. A preferred embodiment of the invention consists of an uppermost awning support member, a pair of intermediate cabinet support members and a lower table support member. Outwardly spaced female channels are connected to each of the horizontal supporting members and the various ammenities, namely, the cabinets, awning and the table; each include a male channel and each of which are adapted to be received in the respective mating female channels. The slidable engagement between the various elements is rather easily achieved so that assembly takes very little time. Furthermore, storage of the equipment is most convenient since the skeletal structure, in the disassembled state, comprises six or more tubular members, the table is of the folding type so that it consumes very little space, the awning is of similar characteristics, and the cabinets can be stored in the most convenient place in the interior of the vehicle.

The above and other objects of the present invention will be apparent as the description continues, and when read in conjunction with the appended drawings.

BRIEF DESCRIPTION OF THE DRAWINGS

FIG. 1 is a perspective view of the present invention shown fully assembled to a van-type vehicle;

FIG. 2 is an isolated plan view of the tubular skeletal structure of the instant invention;

FIG. 3 is a cross-sectional view taken along line 3—3 of FIG. 2;

FIG. 4 is a cross-sectional view taken along line 4—4 of FIG. 2;

FIG. 5 is a view similar to FIG. 4 showing the cabinets partially cut-away and assembled to their respective horizontal supporting members;

FIG. 6 is a cross-sectional view taken along line 6—6 of FIG. 2 illustrating the means of connection to the roof rain gutter; and FIG. 7 is a view taken along lines 7—7 of FIG. 2 illustrating the claw or lower terminal of the main support members.

DETAILED DESCRIPTION

Referring to FIG. 1, there is shown a van 10 which is similar in many respects to the Volkswagen van that is very popular in personal as well as commercial use. The apparatus comprising the instant invention is connected to either side panel 12 of the vehicle at any convenient station along the surface thereof. The only limitation in its placement, of course, would be in a position wherein it would block the door 14. Since the vehicle is stationary when the apparatus is assembled, the fact that it blocks one or more of the windows of the vehicle is immaterial.

FIG. 1 illustrates the three primary ammenities that are useful on a camping trip; a table 16 which includes legs 18, 20 that fold parallel to the table surface when it is not being used, a series of storage cabinets 22 which are assembled at a central portion of the apparatus, and an awning 24 which provides shade and shelter for the immediate area.

FIG. 2 illustrates the nature of the skeletal structure to which the ammenities are connected. All the various elements of the skeletal structure are hollow tubular type members in the nature of pipes depending for the most part on telescopic joining to quickly and easily assemble the skeleton. The main support for the skeleton is provided by a pair of elongated tubular members 30, 32 which are assembled along the entire height of the side 12 and which are affixed to the roof rain gutter 34 and the lower bottom part 36 of the vehicle. At various stations along each main supporting member 30, 32 are sleeves 38a through 38f. The sleeves are connected to the main supporting members so that they face inwardly or toward each other when the skeleton is assembled to the vehicle. Auxiliary, horizontal supporting members 40, 32, 44 and 46 are affixed to the skeleton and are designed to provide the support for the ammenities 16, 22 and 24. Auxiliary member 40 has its tapered ends received in sleeves 38a and 38f and is utilized in support of the cabinets 22. Auxiliary member 42 is similarly connected in sleeves 38b and 38e and provides secondary support for the cabinet 22. Auxiliary member 44 is also similarly received in sleeves 38c and 38d and supports the table 16. The auxiliary member 46 is somewhat differently connected to the main support members 30, 32 in that it includes a pair of legs 50, 52 which are received in the upper openings of the main support members. In this manner, the awning 24 is disposed as high above the other ammenities as possible.

FIGS. 6 and 7 illustrate the basic means of affixing the main support members 30, 32 to the vehicle. In FIG. 6 there is shown an arm 54 which curves from a point spaced outwardly and above the roof rain gutter 34 to that gutter. At the lower terminus of the arm 54 is a fixed plate 56. The roof rain gutter is shown as having several angled surfaces notably 58, 60 and 62. A companion clamp 64 is profiled similar to the external surfaces of the roof rain gutter 34 and when connected thereto provides for substantially complete surface contiguity. A bolt 66 is received in aligned holes in plate 56 and clamp 64 and the components interact to squeeze the rain gutter between clamp 64 and plate 56. The bolt 66 and wing nut 68 permit the ready assembly and disassembly to the rain gutter 34 with little cumbersome manipulation.

To connect the main support member 30, 32 to the lower body part of the vehicle, the terminal end parts are formed as wedges or claws 70. Those claws are adapted to grasp the lower body part at the same time the clamp 64 engages the rain gutter 34.

Turning to FIG. 3, we see illustrated the means by which table 16 is connected to the auxiliary support member 44. A female channel 80 is affixed to that support member 44 and faces outwardly from the vehicle. A male channel 82 is connected to the inside edge of the table 16 and has its outer surface contoured similar to the inside surface contour of the female channel 80. To assemble the table to the auxiliary support member 44, one merely inserts the male channel 82 into the female channel 80 and slides it therein until it reaches its normal assembled position.

FIG. 5 illustrates a similar arrangement for the cabinets 22 to the auxiliary support member 40, 42. Auxiliary support member 40 includes a female channel 84 and a compatible male channel 86 and a sliding engagement is affected therebetween similar to the engagement between channels 80 and 82 used to connect up the table 16. The lower portion of the cabinets 22 include a spacer member 88 which rests against the auxiliary support member 42 and prevents the lower rear of the cabinet from striking the auxiliary support member 42 and either damaging its casing or excessively agitating the contents of the cabinets.

FIG. 6 illustrates the mechanism responsible for connecting the awning 34 to the auxiliary support member 46. A substantially circular channel 90 is affixed to the auxiliary support member 46 and a similarly contoured but smaller male channel 92 is slidably received within channel 90 much in the same way as the engagements were affected for the table and the cabinet. In all the engagements, a pin may be utilized to affect a secure joinder between the ammenity and the auxiliary support member. These pins would be received in a pair of aligned holes formed in the male and female channels associated with each ammenity.

It should be evident that upon reaching the camp site, the camper removes the various supporting members and assembles them quickly and efficiently on the side of the van. The ammenities are assembled with even greater facility and consequently very little time is wasted assembling the camping gear permitting more time for recreational activities. It should be obvious that any other ammenity that may be of use in such a trip may be similarly assembled but all such conveniences need not be specifically described for the purposes of this application. The present invention converts a multi-purpose vehicle to recreational use without expensive or permanent alterations thereto.

Many changes may be made in details of the instant invention, in the method and materials of fabrication, in the configuration and assemblage of the constituent elements, without departing from the spirit and scope of the appended claims, which changes are intended to be embraced therewithin.

I claim:
1. For use with a vehicle, a camping assembly which comprises:
   a pair of main support members removably connected vertically to a side of the vehicle, in a spaced parallel relationship,
   roof rain gutter attachment means for removably attaching said main support members to a roof rain gutter of the vehicle,
   said roof rain gutter attachment means comprises a member projecting from each of said main support members to a point spaced outwardly therefrom and above the roof rain gutter and sloping toward and laterally adjacent the roof rain gutter,
   vice means connected to the laterally adjacent terminal end of said members for releasably locking said roof rain gutter in said vice means,
   said vice means comprising a fixed arm depending from said member and engaging said roof rain gutter, and
   an adjustable clamp member contoured similar to the contour of the roof rain gutter and adapted to grasp the roof rain gutter with substantial surface contiguity,
   the lower extremity of each of said main support members being contoured for closely abutting a lower body part of the vehicle, whereby the main support members are tensionly assembled to the vehicle,
   a plurality of horizontally extending auxiliary support members removably connected to said main support members, female channel members connected to said auxiliary support members, a cabinet and awning each adapted for connection to one of said auxiliary support members, each of said cabinet and awning having a male channel connected to one end thereof for slidable reception in said female channels, and a pin removably received in mutually aligned holes in said male and female channels to secure said male channel in said female channel.

2. The assembly of claim 1 wherein:
said vice means further comprises fastener means releasably connecting said fixed arm and said clamp for releasably locking the roof rain gutter therebetween.

* * * * *